(12) United States Patent
Bacher et al.

(10) Patent No.: US 6,227,380 B1
(45) Date of Patent: May 8, 2001

(54) DEVICE FOR FILTERING FLUIDS CONTAINING IMPURITIES

(76) Inventors: Helmut Bacher, Bruck/Hausleiten 17; Helmuth Schulz, Badstrasse 20, both of St. Florian (AT), A-4490; Georg Wendelin, Waldbothenweg 84, Linz (AT), A-4033

( * ) Notice: Subject to any disclaimer, the term of this patent is extended or adjusted under 35 U.S.C. 154(b) by 0 days.

(21) Appl. No.: 09/319,455

(22) PCT Filed: Dec. 3, 1997

(86) PCT No.: PCT/AT97/00268

§ 371 Date: Jun. 7, 1999

§ 102(e) Date: Jun. 7, 1999

(87) PCT Pub. No.: WO98/24532

PCT Pub. Date: Jun. 11, 1998

(30) Foreign Application Priority Data

Dec. 5, 1996 (AT) .................................................... 2132/96

(51) Int. Cl.[7] ............................ B01D 21/02; B01D 33/58
(52) U.S. Cl. ........................................... 210/408; 210/413
(58) Field of Search ............................. 210/407, 408, 210/413

(56) References Cited

FOREIGN PATENT DOCUMENTS

600928 * 6/1978 (CH) .
3937930 * 5/1991 (DE) .

* cited by examiner

*Primary Examiner*—Chester T. Barry
(74) *Attorney, Agent, or Firm*—Salter & Michaelson

(57) ABSTRACT

A filter apparatus for liquids containing impurities, in particular solid particles, preferably for filtering plasticized thermoplastic synthetic plastic material, has a housing (1) in which at least one stationary, substantially flat filter (5) is disposed. The liquid to be cleaned is supplied to the filter (5) in the region of its periphery through at least one supply channel (3). The cleaned liquid is conducted off the housing through at least one downstream channel (7). At least one scraper element (17) is pressed with its scraping edge (31) against the upstream-side surface (11) of the filter (5), this scraper element (17) being movably connected to a scraper carrier (12) which can be rotated by a drive means (15) around an axis which is directed substantially perpendicular to the upstream-side surface (11) of the filter (5). The scraper element (17) strips off the impurities adhering to this surface (11) and conveys them towards the center of the filter (5) wherefrom the impurities are conveyed off the housing by means of at least one screw (38) through at least one discharge channel (39) starting from the center of the filter (5) and extending out of the housing (1). At least one scraper element (17) is connected to the scraper carrier (12) so that it can swivel around an axis (18) and the scraper element (17) extends from this axis obliquely with respect to the filter (5) in direction of rotation of the scraper carrier (12). The scraping edge (31) of the scraper element (17) is pressed by the counter-pressure of the liquid to be cleaned against the filter (5), when the scraper carrier (12) is in rotation. Thereby, a blocking of the scraper element (17) is effectively avoided.

22 Claims, 4 Drawing Sheets

DEVICE FOR FILTERING FLUIDS CONTAINING IMPURITIES

TECHNICAL FIELD

The invention relates to a filter apparatus for liquids containing impurities, in particular solid particles, and more particularly to a filter apparatus for filtering plasticised thermoplastic synthetic plastic material, comprising a housing in which there is disposed at least one stationary, substantially flat filter to which the liquid to be cleaned is supplied in the region of its periphery by means of at least one supply channel, and from which the cleaned fluid is conducted off and out of the housing through at least one downstream channel, and further comprising at least one scraper element which has a scraping edge that is pressed against the upstream side surface of the filter and is movably connected to a scraper carrier which can be rotated by a drive means around an axis disposed substantially perpendicular to the upstream-side surface of the filter, whereby the scraper element strips off the impurities adhering to this surface and conveys them towards the center of filter, wherefrom the impurities are conveyed off the housing by means of at least one screw through at least one discharge channel starting from the center of the filter and extending out of the housing.

BACKGROUND OF RELATED ART

Such a filter apparatus is known (WO 94/17981). Within this known apparatus, each one of the scraping edges is constituted by a plurality of scraper elements separated from each other and pressed against the filter either by means of springs or by means of the pressure of the supplied liquid to be filtered. In the latter case, the scraper elements are movably connected to the scraper carrier by means of pins directed perpendicular to the filter surface so that each element can move along the pins, and each scraper element is so designed that the pressure exerted on it by the supplied liquid in direction towards the filter is greater than the pressure acting in the opposite direction. Both embodiments, however, suffer from the disadvantage that a solid particle can adhere between the filter and the scraper element, so that it is not engaged by the scraping edge of the scraper element. Then, this solid particle keeps the scraper element spaced apart from the filter surface to be cleaned so that the respective scraper element becomes inactive. This leads not only to a decrease of the cleaning effect on the upstream-side filter surface, but frequently causes also an additional wear on this surface by solid particles conveyed always along a circle and having frequently sharp edges.

SUMMARY

The invention has at its object to avoid this disadvantage of the known apparatus in a simple manner. The invention solves this task by the fact that at least one scraper element is mounted on the scraper carrier swivellable around an axis and protudes from this axis towards the filter obliquely and in direction of motion of the scraper carrier, the scraping edge of the scraper element being pressed towards the filter during revolution of the scraper element by the counter-pressure of the liquid to be cleaned. Therefore, the respective scraper element is so mounted on the scraper carrier that it can freely oscillate or swing, however, it protudes from the scraper carrier in direction of its rotation. As soon as the revolution of the scraper carrier around its axis of revolution is started, the counter-pressure exerted onto the scraper element by the fluid to be cleaned presses this scraper element against the filter surface to be cleaned so that there an effective scraping action occurs. There are no dead spaces in which solid particles can rest, so that there are no particles hindering this function of the scraper element, so that always a reliable function of the scraper element is ensured, if the construction is suitably made.

According to a preferred embodiment of the invention, the scraper element has a straight-lined scraping edge extending parallel to the swivel axis, the outer end of the scraping edge advances or leads relative to a radial line starting from the axis of rotation of the scraper carrier and extending to the inner end of the scraping edge, when seen in direction of revolution of the scraper carrier. By this disposition of the swivel axis of the scraper element and its scraping edge a conveyance of the impurities scraped off the filter surface to be cleaned towards the center of the filter is automatically obtained, when the scraper carrier rotates, and these impuritites are taken up by at least one screw and are conveyed off the housing through the discharge channel.

As a rule, a plurality of scraper elements are swivelably connected to the scraper carrier in the described manner, and these scraper elements are arranged star-shaped with respect to the axis of revolution of the scraper carrier. However, always two or more scraper elements can be disposed along an arm of such a star so that their scraping edges constitute extensions with respect to each other, e.g. along curved paths, as this is the case within scraper elements of the initially described known apparatus. As a rule, however, one single scraper element per said arm of the star is sufficient. In order to ensure that the impurities scraped off by the scraper element are reliably conveyed towards the center of the filter element, according to a further embodiment of the invention a protrusion on the scraper carrier may be provided adjacent to the inner end of the scraping edge of the scraper element which protrusion is directed towards the center region of the scraper carrier and conveys the impurities towards the center of the filter and to the discharge channel. Preferably, within the spirit of the invention, this protrusion is formed as a ledge extending with its longitudinal extension in direction of the scraping edge of the scraper element.

According to a suitable further embodiment of the invention, the scraper element carries a wearing member which constitutes the scraping edge and preferably is exchangeable. As soon as a wear occurs at this wearing member, this wearing member is exchanged so that an effective function is obtained again.

A particular favourable embodiment of the inventions consists in that the supply channel is conducted into a space between two adjacent filters which preferably are disposed in parallel to each other, the scraper carrier being common for both filters and carries on its both sides scraper elements cooperating with the filters, which scraper elements preferably are disposed in pairs, each of which scraper elements carries on its end facing the filter a member constituting the scraping edge, preferably a wearing member, which member has two scraping edges and the scraper elements of the one side of the scraper carrier are exchangeable against the scraper elements of the other side of the scraper carrier. Thereby, the working life time of each scraper element or, respectively, of its wearing member can be doubled.

A further improvement of the filter action can be obtained according to a further embodiment of the invention by the fact that at least one supply channel leads to a distribution space which surrounds the filter or the filters along at least of a major part of its periphery or their periphery, respectively, which distribution space is in connection via a plurality of openings provided in an intermediate wall with the upstream-side of the filter or, respectively, with the space disposed between the two filters. The distribution space ensures that the filter surface over at least the major part of its periphery, if desired even over the entire periphery, is supplied with the liquid to be cleaned. The openings in the intermediate wall constitute a preliminary filter which retains coarse impurities, e.g. metal clips, stones and the like. Thereby, the real filter is relieved and treated with care.

BRIEF DESCRIPTION OF THE DRAWINGS

Further features and advantages of the invention can be seen from the description of examplative embodiments of the subject matter of the invention, which embodiments are schematically shown in the drawings.

DETAILED DESCRIPTION OF THE ILLUSTRATIVE EMBODIMENT

Figure 1:
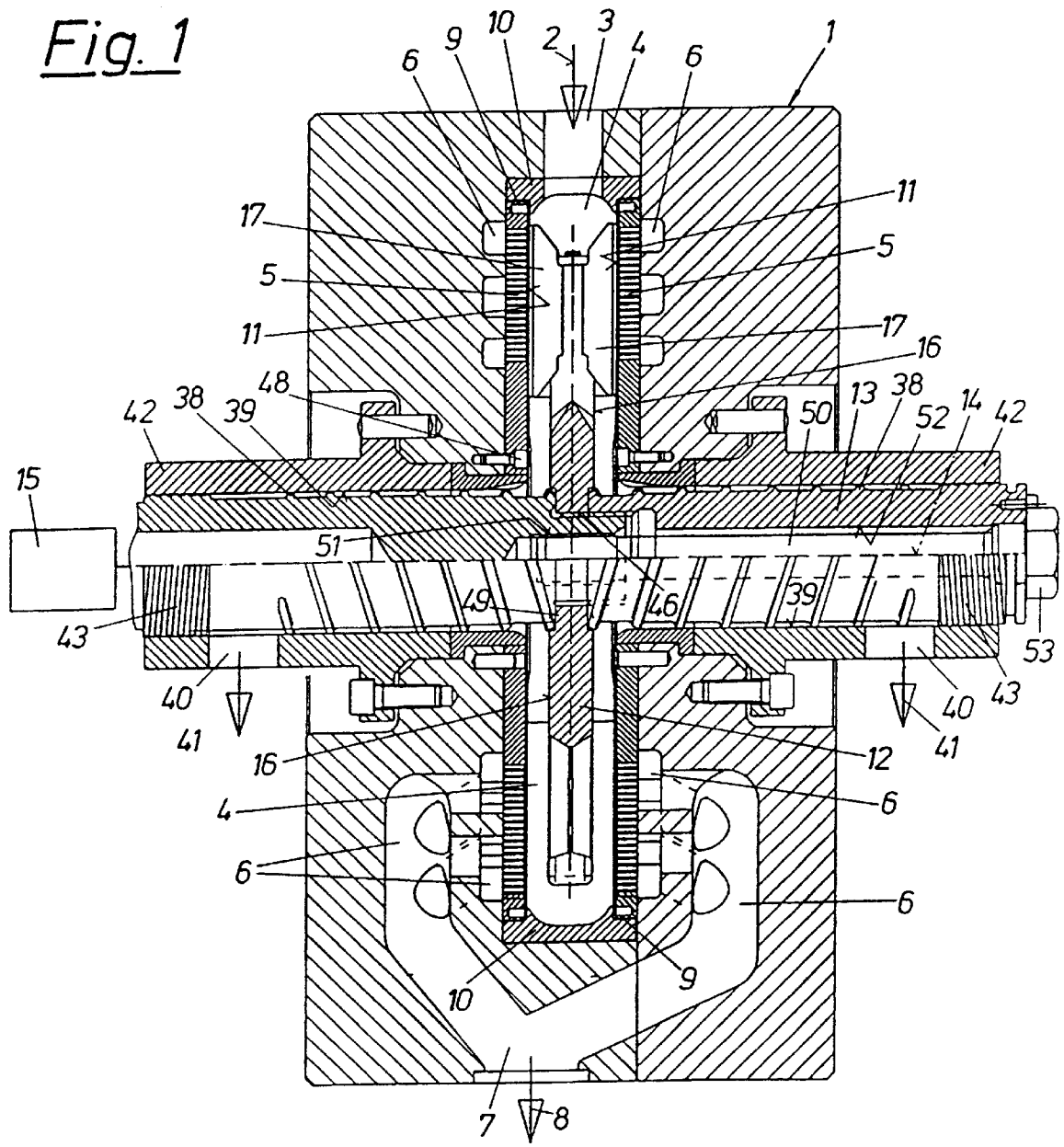
FIG. 1 shows a vertical section through a filter apparatus.

The filter apparatus according to FIG. 1 has a housing 1 into which the liquid impured by solid particles, in particular soiled thermoplastic plasticised synthetic material, is introduced into a supply channel 3 in direction of the arrow 2. This supply channel 3 leads to an annular space 4 which is provided between two parallelly disposed stationary filters 5, each of which being substantially flat. Preferably, each one of these filters 5 comprises a filter plate provided with fine holes which, preferably, are bored by means of electron beams or laser beams, whereby this filter plate is abutted on its downstream side by a support plate, the penetration bores of which having a substantially greater diameter than the fine holes of the filter plate. This enables to load the filter by high pressures, e.g. about 300 bar and more, of the supplied fluid to be cleaned. The filters 5 or, respectively, the plates of each filter structure are flat, however, they may slightly differ from the complete flat form, in particular, they may be slightly cone-shaped. A plurality of supply channels 3 may lead into the space 4 between the two filters 5.

Collection spaces 6 are disposed on the downstream side of each filter 5 and each collection space 6 leads to a downstream channel 7 through which the cleaned fluid flows off the housing 1 in direction of the arrow 8. A plurality of downstream channels 7 may be provided. Each downstream channel 7 as well as each supply channel 3 is disposed in the region of the outer pheriphery of the two ring disks constituting the two filters 5.

The two filters 5 are secured within the housing 1 against rotation and are sealingly fixed on their outer periphery 9 by means of annular mountings 10 so that any bent of the filters 5 can be taken up which may occur due to the high pressure of the material to be filtered. Simultaneously, these mountings 10 constitute sealing means for the space 4 so that no material to be filtered may reach the downstream channel 7 by by-passing the filter 5.

Figure 2:
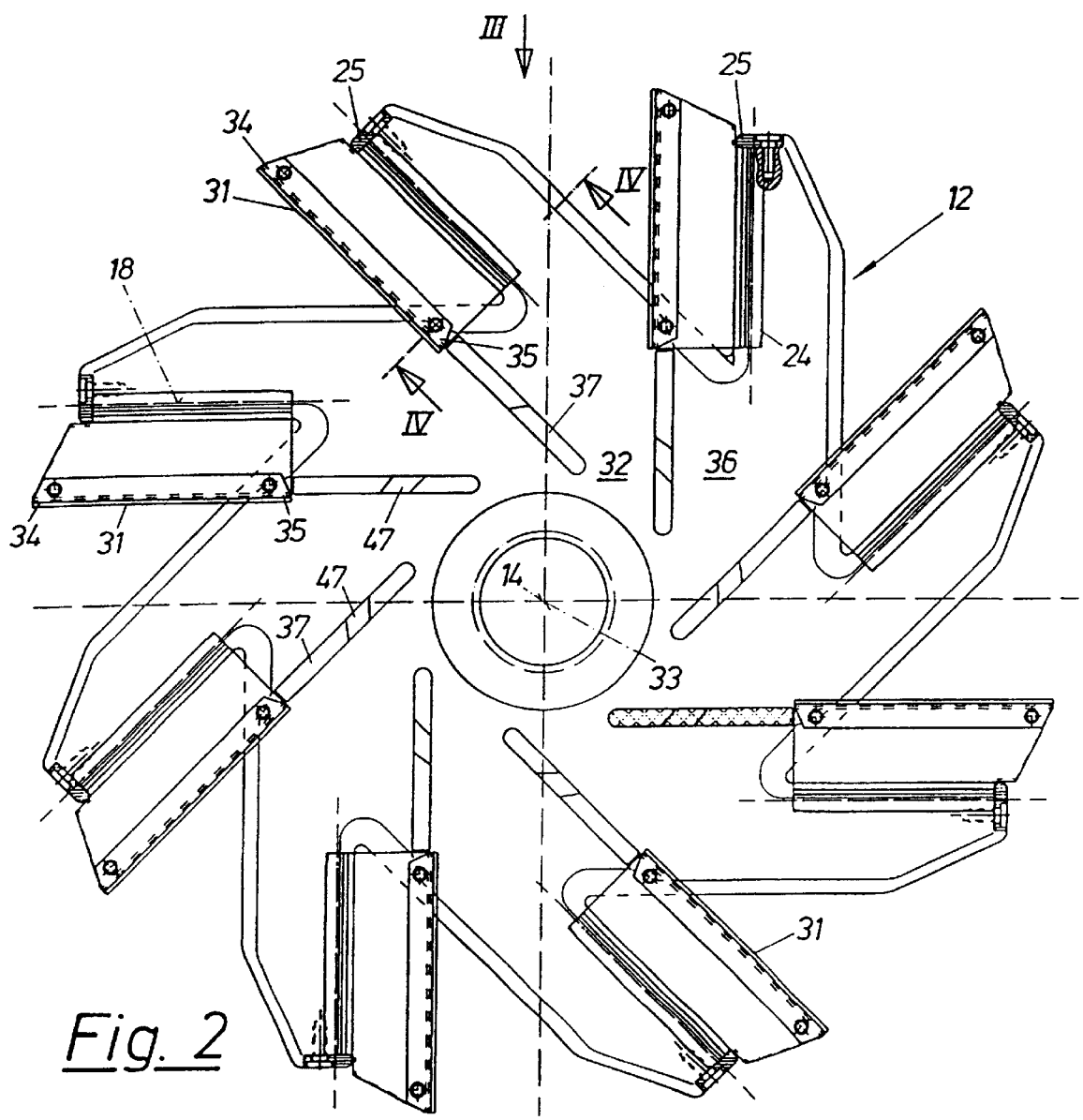
FIG. 2 shows a view of the scraper carrier, seen in direction of the axis of its rotation.
Figure 3:
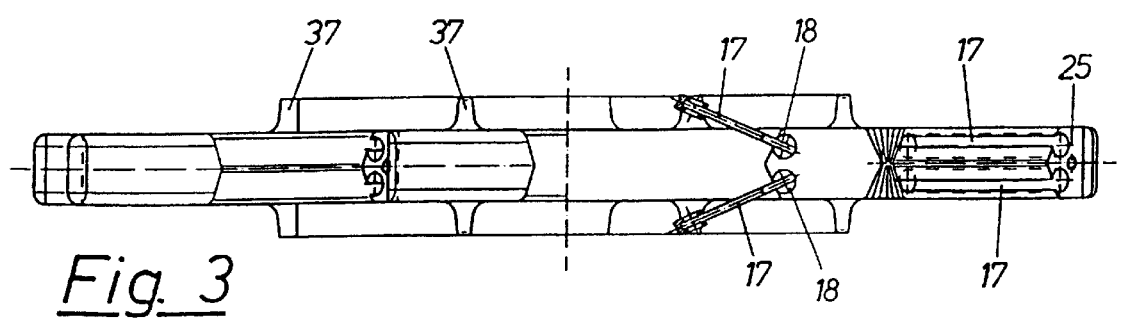
FIG. 3 is a top view to FIG. 2 in direction of the arrow III.
Figure 4:
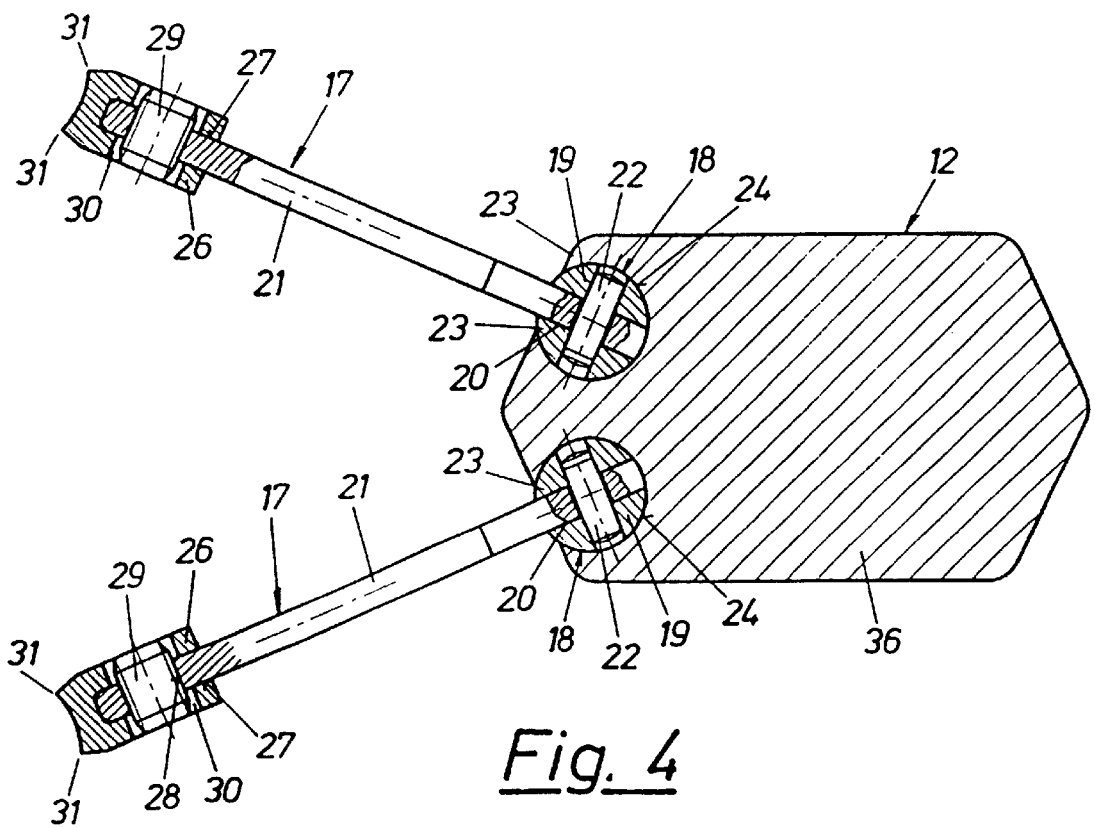
FIG. 4 shows a detail in a section taken along the line IV—IV of FIG. 2 in an enlarged scale.

The impurities of the supplied liquid which cannot pass the fine openings of the filter 5, gather at the upstream-side surface 11 of the filter 5 and are scraped off there. For this, a disk-shaped scraper carrier 12 is disposed between the two filters 5 and this scraper carrier is connected in its center region for common rotation with a shaft 13, the axis 14 of which is directed perpendicular to the plane of each one of the filters 5, this axis simultaneously constituting the axis of rotation of the scraper carrier 12. This shaft 13 is connected to a drive means 15 for continuous rotation around its axis 14, this drive means 15 being only schematically shown. The scraper carrier 12 carries on each one of its two surfaces 16, each one of which faces the respective filter 5, a plurality of scraper elements 17 which are disposed in equal distances from each other along the periphery of the scraper carrier 12. Each one of these scraper elements 17 is mounted on the scraper carrier 12 swivellably around an axis 18 (FIGS. 2, 4, 5), which axis in the embodiment shown is formed by a round profile member 19 composed of two rods each of one having a semicircular cross section, the two rods being disposed mirror-inverted, and a plate 21 is inserted into the space 20 between the two semi-circular rods, which plate 21 constitutes the base body of the scraper element 17 and is connected loosely to the two semi-circular rods by means of pins 22 extending perpendicular to the plane of the plate 21, however, the plate 21 being secured against being drawn off the semi-circular rods. One single rod having a circular cross section and being slotted may replace the two semi-circular rods, the plate 21 being inserted into this slot and being secured against pulling off by the pins 22 or by means of screws. The swivelling range of each scraper element 17 around the axis of the rounded profile member 19 is limited by the fact that the rounded profile member over the major part of its periphery is covered by the material of the scraper carrier 12, whereby the regions 23 of the scraper carrier 12 which embrace the rounded profile member 19 constitute limiting stops for the swivelling range of the plate 21. Each rounded profile member 19 is secured against falling out of the scraper carrier 12, e.g. by inserting the rounded profile member into a blind bore 24 (FIG. 2), the open end of this bore being closed by a closure member 25 screwed to the scraper carrier 12.

Each plate 21 of the scraper element 17 carries on its free end a wearing member 26 exchangeably connected to the plate 17. For this, each wearing member 26 has the shape of a ledge and has a longitudinal slot 27 by which it is pinned up to the plate 21 of the scraper element 17. A screw 29 screwed into a transverse bore 28 of the plate 21 secures the wearing member 26 against pulling off the plate 21. The screw 29 is inserted with play into a bore 30 having a greater diameter than the screw 29, so that the screw 29 enters the bore 30 with a clearance so that the wearing member 26 can be slightly moved in direction of the plane of the plate 21. Therefore, the wearing member 26 can follow the bents of the filters 5. Further, thereby inaccuracies of the manufacture are taken up in an easy manner, what is of advantage because the wearing members 26 which as a rule constitute of hard metal, which allows an after treatment only very hard. Each wearing member 26 has two scraping edges 31, always one of which scraping the impurities off the upstream-side surface 11 of the neighbouring filter 5 and carries them towards the region 32 of the center of the scraper carrier 12. This is ensured on the one hand by rotating the scraper carrier 12 around the axis 14 by means of drive means 15, and on the other hand by directing the scraping edges 31 so that their longitudinal direction extends past the axis 14 (that is identical to the center 33 of the scraper carrier 12 or, respectively, of the two filters 5), so that the outer end 34 of each scraping edge 31 advances relative to a radial direction extending from the axis 14 of the scraper carrier 12 and leading through the inner end 35 of the scraping edge 31. Following each wearing member 26, the disk constituting the body member 36 of the scraper carrier 12 carries always a protrusion 37 which protrusions—as to say—form extensions of the scraper edges 31 and convey the impurities scraped off towards the center region 32 of the scraper carrier 12. In this region, the impurities are taken up by two screws 38 starting from the two sides of the scraper carrier 12 and extending in opposite directions, and having screw threads machined into the surface of the shaft 13, the screws 38 being bearingly supported within discharge channels 39 through which the impurities are conveyed by the screws 38 towards openings 40 through which the impurities leave the respective housing 42 of the screw 38 in direction of arrows 41. The outer end of each shaft 13 is provided with screw threads 43 behind the opening 40, which screw threads are oppositely directed to the direction of the screw threads of the screw 38, so that these screw threads 43 act as a sealing.

In the embodiment shown, each protrusion 37 has the shape of a ledge, the longitudinal direction of which extends parallel to the longitudinal direction of the straight-lined scraping edge 31. However, the protrusions 31 can also be designed as filler pieces of any desired shape, e.g. having triangular shape or curved, and if so, the shape of the curvature or, respectively, the angle of the bent of this filler piece constituting the protrusion is so chosen that the said conveyance of the impurities towards the center of the scraper carrier 12 is ensured. In an analogous manner, the scraping edges 31 must not extend straight-lined, they may also have a curved or bent or angled shape.

Figure 5:
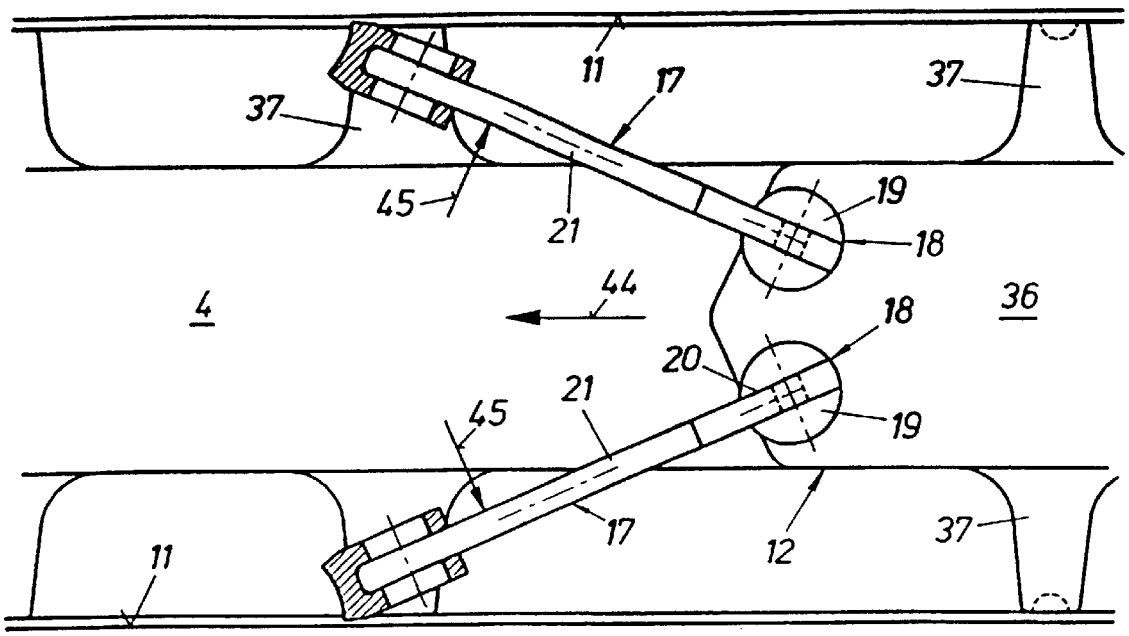
FIG. 5 shows the cooperation of two scraper elements with the adjacent filter surfaces.

In operation, when the scraper carrier 12 rotates in direction of the arrow 44 (FIG. 5) around its axis 14, the wearing member 26 is pressed with its outer scraping edge 31 against the upstream-side surface 11 of the filter 5 (see also FIG. 5). This pressure is exerted by the counter pressure in direction of the arrows 45 exerted by the liquid to be filtered within the space 4 onto the plates 21, when the scraper elements 17 are advanced. Thus, no springs are necessary in order to press the scraper edges against the filter, so that the apparatus is insensitive to spring fracture. Further, this pressing is also substantially independent from the pressure of the fluid to be filtered within the space 4, so that the apparatus can be used for any pressure of the material to be filtered. However, the said pressing of the scraper element 17 against the filter surface 11 is dependent from the rotational speed of the scraper carrier 12 within the space 4 and from the viscosity of the liquid to be filtered so that there is the possibility to adjust the desired pressure by which the scraper elements 17 are pressed onto the filter surface 11 by selection of this rotational speed, or, respectively, to adapt the operation to the viscosity of the liquid to be filtered. The function of the scraper elements 17 cannot be detrimentally influenced or blocked by solid particles squeezed between the scraper elements 17 and the filter surface 11.

The arrangement of two filters 5 in parallel has not only the advantage of an increase of the active filter surface and thereby of an increase of the throughput of the filter apparatus, but also the advantage that the scraper elements 17 cooperating with the one filter 5 can be exchanged against the scraper elements cooperating with the other filter 5, so that thereby an exchange of the respective active scraping edge 31 of each scraper element 17 can be obtained. For this, only the screws fixing the closure member 25 must be loosened and the scraper elements 17 with their rounded profiles 19 must be pulled off the respective bores 24, and then, the scraper elements 17 must be exchanged in the described manner and the rounded profiles 19 must be inserted again into the bores 24 and secured by means of the closure members 25, whereupon the apparatus is ready for operation again.

In order to enable mounting and dismounting, the housing 1 is composed of two parts and also the shaft 13 is composed of two parts, the two shaft parts being connected to each other for common rotation by a positive connection 46 (FIG. 1), e.g. by means of a hexagon connection or a toothed connection, so that both shaft parts can be driven for rotation in common by the drive means 15. The scraper carrier 12 is inserted into a step 49 of the two sections of the shaft 13 and is connected thereto for common rotation in the same manner as the two parts of the shaft. This construction is held together by a screw 50, the outer threads of which are screwed into inner threads 51 of the left hand shaft part, which screw intersects a bore 52 of the right hand a shaft part and is abutted with its head 53 to this shaft part.

If desired, the ledge-shaped protusions 37 may have interruptions 47 (FIG. 2), in order to give more room for the screws 48 by which the filters 5 are screwed to the housing 1.

Figure 6:
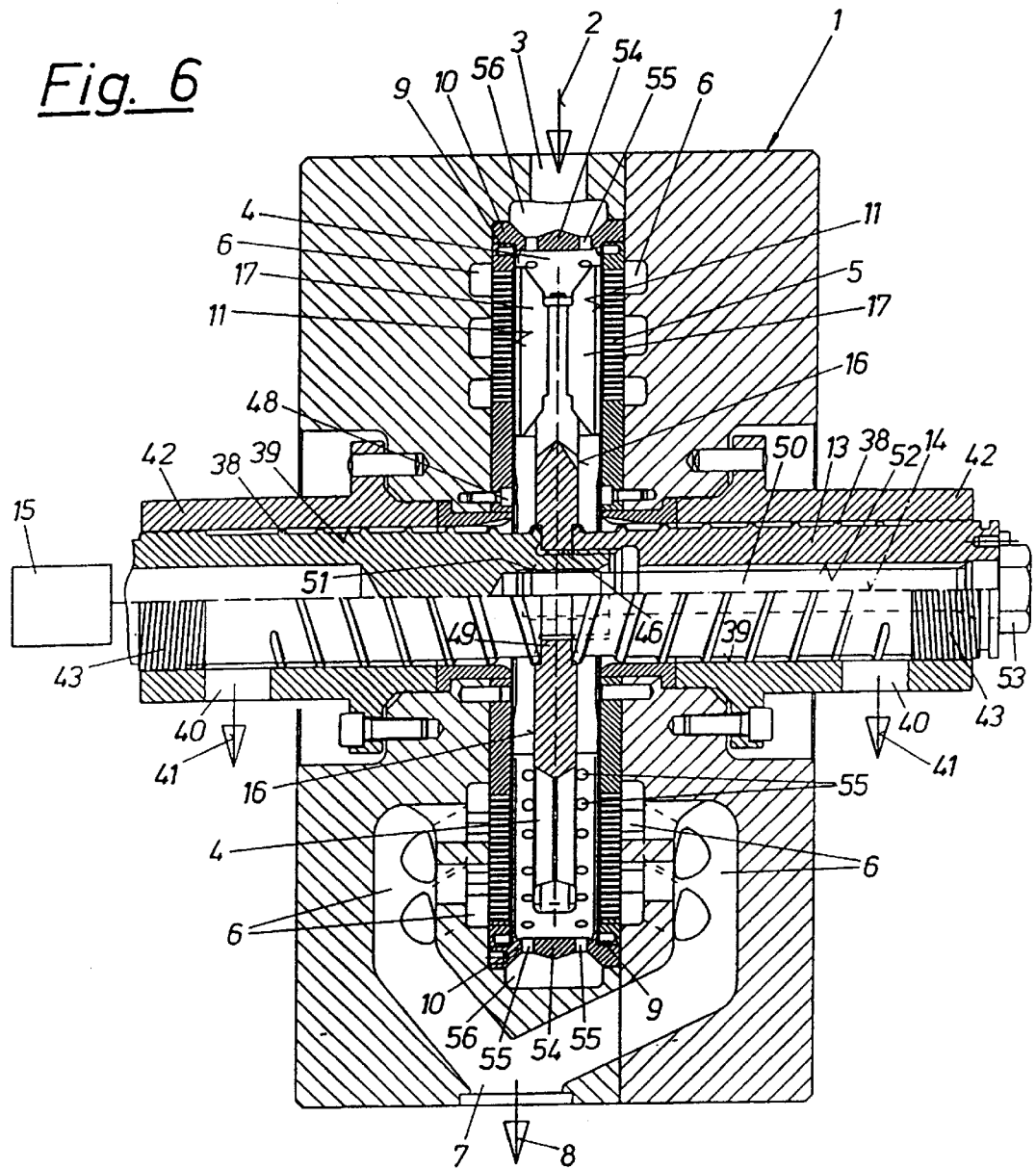
FIG. 6 shows a variant to FIG. 1.

The embodiment according to FIG. 6 differs from that according to FIG. 1 in that the mounting 10 for the two filters 5 is an annular intermediate wall 54 which is perforated along its periphery by a plurality of openings 55. This intermediate wall 54 confines together with the housing 1 an annular distribution space 56 which is in flow connection with the supply channel 3 or the supply channels and surrounds the filters 5 along their outer peripheries and via the openings 55 is in flow connection with the space 4 so that the upstream-side surfaces 11 of the filters 5 are equally supplied with liquid to be filtered. Simultaneously, the intermediate wall 54 with its openings 55 constitutes a pre-filter which retains coarse impurities introduced by the liquid to be cleaned via the supply channels 3 into the distribution space 56.

What is claimed is:

1. Filter apparatus for liquids containing impurities, in the form of solid particles comprising:

a housing in which at least one stationary, substantially flat filter is disposed to which the liquid to be cleaned is supplied in the region of its periphery via at least one supply channel and from which the cleaned fluid is conducted off the housing via at least one downstream channel, at least one scraper element, having a scraping edge that is pressed against the upstream-side surface of the filter and is movably connected to a scraper carrier that is rotatable around an axis disposed substantially perpendicular to the upstream-side surface of the filter by a drive means, the scraper element scraping off the impurities adhering to this surface and conveying them towards the center of the filter, wherefrom the impurities are conveyed off the housing by means of at least one screw via at least one discharge channel that starts from the center of the filter and conducts the impurities out of the housing, wherein at least one scraper element is connected to the scraper carrier swivellably around an axis and extending from this axis in the direction of rotation of the scraper carrier and obliquely to the filter, the scraping edge of the scraper element being pressed against the filter during revolution of the scraper element by the counter-pressure of the liquid to be cleaned.

2. Filter apparatus according to claim 1, wherein the scraper element has at least one straight-line scraping edge disposed in parallel to the swivel axis, the outer end of the scraping edge advances relative to a radial line starting from the axis of rotation of the scraper carrier and extending to the inner end of the scraping edge, when seen in direction of revolution of the scraper carrier.

3. Filter apparatus according to claim 1, wherein a protrusion is provided on the scraper carrier adjacent to the inner end of the scraping edge, which protrusion is directed towards the center region of the scraper carrier and conveys the impurities towards the center of the filter.

4. Filter apparatus according to claim 3, wherein the protrusion is a ledge extending with its longitudinal direction in longitudinal direction of the scraping edge of the scraper element.

5. Filter apparatus according to claim 1, wherein the scraper element comprises a plate connected on its edge to a rounded profile member, which rounded profile member is inserted into a matching bore of the scraper carrier so that a swivel bearing for the plate is formed.

6. Filter apparatus according to claim 5, wherein the regions of the scraper carrier which embrace the rounded profile member constitute stop limits for the swivel region of the scraper element.

7. Filter apparatus according to claim 5, wherein the rounded profile member is formed by a rod having a circular cross section, which rod is connected by means of transversely extending screws or pins to the plate and is secured against falling out of the bore.

8. Filter apparatus according to claim 1, wherein the scraper element carries a wearing member constituting the scraping edge.

9. Filter apparatus according to claim 1, wherein the supply channel leads into a space between two adjacent filters, the scraper carrier being common for both filters and carries on both of its sides scraper elements cooperating with the filters, each one of these scraper elements carries on its end facing the filter a member constituting the scraping edge, which member comprises two scraping edges, the scraper elements of the one side of the scraper carrier being exchangeable against the scraper elements of the other side of the scraper carrier.

10. Filter apparatus according to claim 1, wherein at least one supply channel leads to a distribution space which surrounds the filter or the filters over at least a major part of the periphery and is in flow connection via a plurality of openings in an intermediate wall with the upstream-side surface of the filter.

11. Filter apparatus according to claim 10, wherein the openings constitute a pre-filter for coarse impurities.

12. Filter apparatus according to claim 10, wherein the annular intermediate wall constitutes a mounting for the filters.

13. Filter apparatus according to claim 1, wherein the liquid being filtered comprises a plasticized thermoplastic synthetic plastics material.

14. Filter apparatus according to claim 1, wherein the scraper element comprises a plate formed as a unitary structure with a rounded profile member, which rounded profile member is inserted into a matching bore of the scraper carrier so that a swivel bearing for the plate is formed.

15. Filter apparatus according to claim 5, wherein the rounded profile member is formed by two rods each one having a semicircular cross section, which rods are connected by means of transversely extending screws or pins to the plate and are secured against falling out of the bore.

16. Filter apparatus according to claim 15, wherein the rods are secured against falling out of the bore by a closure member closing the end of the bore and screwed to the scraper carrier.

17. Filter apparatus according to claim 7, wherein the rod is secured against falling out of the bore by a closure member closing the end of the bore and screwed to the scraper carrier.

18. Filter apparatus according to claim 8, wherein the wearing member is an exchangeable member.

19. Filter apparatus according to claim 9, wherein the two adjacent filters are disposed parallel to each other.

20. Filter apparatus according to claim 9, wherein the scraper elements comprise a pair of scraper elements.

21. Filter apparatus according to claim 9, wherein the member carried on the scraper elements on the end facing the filter is a wearing member.

22. Filter apparatus according to claim 1, wherein at least one supply channel leads to a distribution space which surrounds the filter or the filters over at least a major part of the periphery and is in flow connection via a plurality of openings in an intermediate wall with the space being disposed between the two filters.

* * * * *